United States Patent
Takekoshi

(10) Patent No.: US 6,197,924 B1
(45) Date of Patent: Mar. 6, 2001

(54) METHOD FOR ISOLATING DIHYDROXYBIPHENYL POLYETHERSULFONES

(75) Inventor: Tohru Takekoshi, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/451,229

(22) Filed: Nov. 29, 1999

(51) Int. Cl.[7] .................................................. C08F 6/00
(52) U.S. Cl. ............................................................ 528/497
(58) Field of Search ............................................. 528/497

(56) References Cited

U.S. PATENT DOCUMENTS

| | | | |
|---|---|---|---|
| 4,948,871 | 8/1990 | Fukuoka et al. | 528/481 |
| 5,229,482 | 7/1993 | Brunelle | 528/125 |
| 5,830,974 | 11/1998 | Schmidhauser et al. | |

OTHER PUBLICATIONS

Poly(aryl Ethers) by Nucleophilic Aromatic Substitution. I. Synthesis and Properties*, RN Johnson, et al, Journal of Polymer Science: Part A–1, vol. 5, pp. 2375–2398 (1967).

*Primary Examiner*—Terressa M. Boykin
(74) *Attorney, Agent, or Firm*—S. Bruce Brown; Noreen C. Johnson

(57) ABSTRACT

Polyethersulfones derived from dihydroxybiphenyls or dihydroxybenzenes, especially 4,4'-dihydroxybiphenyl, are isolated by crystallization from a solvent, preferably a water-immiscible aromatic solvent. Crystallization may be achieved by cooling from the reaction temperature to a temperature in the range of about 20–100° C., optionally with the use of a crystallization aid such as preformed polyethersulfone crystals. The crystallized polyethersulfone is then separated by filtration and by-product salts are removed therefrom by extraction with water.

22 Claims, No Drawings

METHOD FOR ISOLATING DIHYDROXYBIPHENYL POLYETHERSULFONES

BACKGROUND OF THE INVENTION

This invention relates to polyethersulfones, and more particularly to an improved method for preparing dihydroxybiphenyl- and dihydroxybenzene-derived polyethersulfones.

Dihydroxybiphenyl-derived polyethersulfones are known in the art. A common example is the polyethersulfone derived from 4,4'-dihydroxybiphenyl and bis(4-chlorophenyl)sulfone (hereinafter sometimes "DDS"), which comprises structural units of the formula I:

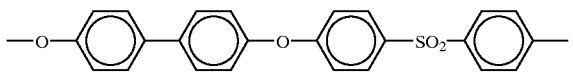

The polyethersulfone of formula I is typically an amorphous, injection moldable resin with high solvent resistance and other desirable properties. It is most often prepared by a reaction of the DDS with an alkali metal salt of the dihydroxybiphenyl (hereinafter sometimes "biphenyl salt") at high temperature (typically at least 140° C.) in solution in a dipolar aprotic solvent, as illustrated by dimethyl sulfoxide and sulfolane, which may be combined with chlorobenzene, as described, for example, in Johnson et al., J. Poly. Sci., Part A-1,5, 2375–2398 (1967). When preparation is complete, it is thus necessary to isolate the polymer by removal from the solvent, typically by precipitation with a rather large amount of anti-solvent such as chlorobenzene. This creates a mixture of organic liquids (solvent and anti-solvent) which, to make preparation economically feasible, must be separated for solvent recycle owing to the high cost of such compounds. Separation procedures are expensive and burdensome.

In an alternative method of polymer isolation, the solvent is removed by volatilization, e.g., by extrusion or filmtrusion. It is preferred, however, to separate by-product alkali metal chloride salt from the polymer before volatilization is undertaken. Removal by filtration is usually impracticable because of the high viscosity of the solution and the small size of the salt crystals. Removal by dissolution in water is even less feasible, since the organic solvent is miscible with water. Thus, polymer preparation in this way is not commercially advantageous.

Another method of preparation, disclosed specifically or by analogy in U.S. Pat. Nos. 5,229,482 and 5,830,974, employs a less polar, water-immiscible solvent such as o-dichlorobenzene or anisole in combination with a phase transfer catalyst. Temperatures in the range of about 125–250° C. are utilized, making it advantageous to employ a phase transfer catalyst which is resistant to high temperatures, such as a hexaalkylguanidinium halide. An advantage of this method is that the by-product salt can be removed by extraction with water, since the solvent is water-immiscible. However, such extraction is often cumbersome and inefficient since there is generally poor phase separation after introduction of water.

In various solid state methods for the preparation of aromatic polycarbonates, as disclosed, for example, in U.S. Pat. Nos. 4,948,871, 5,204,377 and 5,717,056, the normally amorphous polymer is crystallized, often by heat treatment or by contact with a solvent or non-solvent. Such crystallization operations are, however, not known to be operative with polyethersulfones.

It is of interest, therefore, to develop improved methods of preparing and isolating polyethersulfones, particularly dihydroxybiphenyl-derived polyethersulfones and the like. In particular, a method is desired which enables isolation by operations which do not include steps requiring anti-solvent precipitation or separation of phases which separate poorly.

SUMMARY OF THE INVENTION

The present invention is based on the discovery that polyethersulfones can be prepared by any method known in the art and subsequently rendered crystalline. The crystalline polymer is of a particle size which renders it easily separable in the solid state from the reaction mixture in which it was prepared, along with by-product salt which can subsequently be easily removed by extraction with water.

The invention in one of its aspects, therefore, is a method for isolating a dihydroxybiphenyl- or dihydroxyphenyl-derived polyethersulfone which comprises:

(A) treating a solution thereof in an organic solvent to effect crystallization of said polyethersulfone;

(B) separating the resulting crystallized polyethersulfone from said solution; and (C) removing by-product salts from said polyethersulfone.

Another aspect of the invention is crystalline dihydroxybiphenyl- or dihydroxyphenyl-derived polyethersulfones having an average particle size in the range of about 5–100 microns.

DETAILED DESCRIPTION PREFERRED EMBODIMENTS

The polyethersulfones which are the subject of the present invention are typically prepared from at least one monomer unit reagent comprising an alkali metal salt of a dihydroxybenzene such as resorcinol or hydroquinone or a dihydroxybiphenyl such as 3,3'- or 4,4'-dihydroxybiphenyl, with 4,4'-dihydroxybiphenyl being preferred. The salt is typically a sodium or potassium salt. Sodium salts are frequently preferred by reason of their availability and relatively low cost. The other reagent is at least one monomer unit comprising a bis(halophenyl)sulfone such as bis(3-bromophenyl) sulfone or DDS, the latter being preferred. Equimolar proportions of these two reagents are preferably employed. It is also contemplated to employ polyethersulfones containing minor proportions, generally up to about 25 mole percent, of structural units derived from other monomers.

The condensation reaction between these two reagents is conducted under strictly anhydrous conditions. It may be conducted in a dipolar aprotic solvent, in a water-immiscible solvent or in a mixture of the two. Preparation in a solvent system that includes a dipolar aprotic solvent is generally at a temperature in the range of about 150–300° C., as described hereinabove. For simplicity of operation, however, it is highly preferred to employ a solvent system consisting of at least one water-immiscible aromatic solvent such as chlorobenzene, o-dichlorobenzene, trichlorobenzene, chlorotoluene, anisole, phenetole, diphenyl ether or another aromatic compound having a polarity no higher than those, in combination with a phase transfer catalyst and at a temperature in the range of about 125–250° C.

Phase transfer catalysts with high thermal stability, i.e., those that are stable in the range of about 125–250° C., are highly preferred. Various types of phase transfer catalysts have this property. They include quaternary phosphonium salts of the type disclosed in U.S. Pat. No. 4,273,712, N-alkyl-4-dialkylaminopyridinium salts of the type disclosed in U.S. Pat. Nos. 4,460,778 and 4,595,760, and guanidinium salts of the type disclosed in the aforementioned U.S. Pat. No. 5,229,482. Said patents are incorporated by reference herein. The preferred phase transfer catalysts, by reason of their exceptional stability at high temperatures and their effectiveness to produce high molecular weight polyethersulfones in high yield, are the hexaalkylguanidinium and αω-bis(pentaalkylguanidinium) alkane salts. Proportions of catalyst, when employed, are most often in the range of about 1–10 mole percent based on sulfone.

In step A of the method of the invention, the solution of the polyethersulfone is treated to effect crystallization of said polyethersulfone. Such treatment may be by merely cooling a solution in a water-immiscible solvent, preferably the solution in which the polyethersulfone was prepared, from the reaction temperature to one in the range of about 20–100° C., and typically to ambient temperature. Slow cooling, over a period of at least about 2 hours, is often particularly effective for crystallization.

It is also within the scope of the invention to contact the solution before or during cooling with a crystallization aid. The preferred crystallization aid is preformed polyethersulfone in its crystalline form. It is also contemplated to employ inorganic nucleating agents such as titanium dioxide and talc as crystallization aids.

The average particle size of the crystalline polyethersulfone obtained as described above is typically in the range of about 5–500 microns, most often about 20–200 microns and preferably about 50–100 microns. Frequently, at least 90% of the crystalline polyethersulfone particles thus produced have a particle size of at least 15 microns, preferably at least 20 microns. Particle sizes for the purposes of this invention were determined by laser diffraction using a Coulter LS-100 apparatus.

Those skilled in the art will be aware that particle sizes outside the above-noted typical range, and particularly larger particle sizes, may be desired for certain applications; for example, for blending with additives such as pigments, stabilizers and fire retardants and with other polymers. Particles which are too fine may cause dust problems which can lead to powder explosions and other health hazards. On the other hand, for powder coating purposes and aqueous suspensions, e.g., for composite fiber impregnation, finer particles may be required. Modifications to achieve other particle sizes may be include control of polymer concentration, changes in solvent composition, use of different cooling temperatures, alteration in rate of cooling, use and amount of crystallization nucleating agents and the like.

In step B, the crystallized polyethersulfone particles are separated from the solvent and remainder of the reaction mixture. This is typically done by filtration, whereupon by-product alkali metal halide salt is recovered in admixture with the polyethersulfone. Conventional washing steps employing organic solvents such as toluene and methanol may also be employed; they are typically effective to remove phase transfer catalyst from the polyethersulfone.

Finally, in step C the by-product salt is removed from the polyethersulfone. This is typically achieved by simple extraction with water, most often at a temperature in the range of about 60–90° C. for efficient salt dissolution.

The crystalline polyethersulfones of this invention often have advantages over the amorphous form of the same polymers, particularly from the standpoint of handling, since they do not agglomerate.

The method of the invention is illustrated by the following examples. Molecular weights are weight average and were determined by gel permeation chromatography relative to polystyrene.

EXAMPLE 1

A 500 milliliter (ml) three-necked flask equipped with a mechanical stirrer, a Dean-Stark trap connected to a condenser and nitrogen purge means was charged in a nitrogen atmosphere with 9.905 grams (g) (124.15 millimoles [mmol]) of 50.14% aqueous sodium hydroxide solution, 11.559 g (62.08 mmol) of 4,4'-dihydroxybiphenyl, 53 ml of water and 160 ml of cyclohexane. The mixture was heated to reflux, with stirring, whereupon most of the water was removed as an azeotrope with the cyclohexane; 150 ml of toluene was then added over 1.5 hours and distillation was continued to remove all water and cyclohexane.

o-Dichlorobenzene, 100 ml, was added and the Dean-Stark trap was replaced by a recirculating trap containing calcium hydride as a drying agent. The o-dichlorobenzene was refluxed through the trap for 2 hours, after which the solution was cooled and 17.826 g (62.08 mmol) of DDS, 1.310 g (4.97 mmol) of hexaethylguanidinium chloride and 25 ml of dry o-dichlorobenzene were added. The mixture was heated under reflux for 7 hours and the resulting viscous solution was diluted with 150 ml of o-dichlorobenzene and allowed to cool to room temperature over three hours, whereupon the product polyethersulfone precipitated as fine solid particles. The resulting thick slurry was filtered and the filtration residue was washed with 100 ml of toluene, followed by 100 ml of methanol and two portions of hot water. Finally, the purified polyethersulfone was dried in a vacuum oven at 100° C. The yield was 95.3% of the theoretical amount of a product having a sodium content of 58 parts per million (ppm). Its average particle size was 63 microns and 90% of the particles had a size of at least 25 microns. The glass transition temperature (Tg) and melting temperature (Tm) values were 226° and 264° C., respectively.

EXAMPLE 2

A 500 ml three-necked flask set up as in Example 1 was charged in a nitrogen atmosphere with 10.011 g (125.48 mmol) of 50.14% aqueous sodium hydroxide solution, 11.683 g (62.74 mmol) of 4,4'-dihydroxybiphenyl, 50 ml of water and 160 ml of cyclohexane. The mixture was dehydrated as in Example 1 and anisole, 100 ml, was added and refluxed through the calcium hydride trap for 1.5 hours, after which the solution was cooled and 18.017 g (62.74 mmol) of DDS and 25 ml of dry anisole were added. The mixture was reheated to 145° C., 1.32 g (5.02 mmol) of hexaethylguanidinium chloride was added and the mixture was heated under reflux (155° C.) for 8 hours. The resulting viscous solution was diluted with 150 ml of o-dichlorobenzene and allowed to cool to room temperature, whereupon the product polyethersulfone precipitated as fine solid particles. The resulting thick slurry was filtered and the filtration residue was washed with 200 ml of methanol and two portions of hot water. Finally, the purified polyethersulfone was dried in a vacuum oven at 100° C. The yield was 95.4% of the theoretical amount of a product having a sodium content of 32 ppm. Its average particle size was 177 microns and 90% of the particles had a size of at least 38 microns. The molecular weight was 48,400.

EXAMPLE 3

The procedure of Example 2 was repeated, employing 9.919 g (124.33 mmol) of aqueous sodium hydroxide, 11.576 g (62.17 mmol) of 4,4'-dihydroxybiphenyl, 17.852 g (62.17 mmol) of DDS and 1.73 g (4.97 mmol) of hexa-n-propylguanidinium chloride. Upon completion of the reaction, 150 ml of anisole was added and the mixture was cooled to 85° C. and spiked with 50 milligrams (mg) of preformed crystalline polyethersulfone. The polyethersulfone product, obtained in 95.1 % yield, had a sodium content of 29 ppm and an average particle size of 119 microns; 90% of the particles had a size of at least 20 microns. The molecular weight was 53,700.

EXAMPLE 4

In a control experiment, a 15% (by weight) solution in sulfolane of polyethersulfone produced by the reaction of 4,4'-dihydroxybiphenyl with DDS was maintained at 30° C. and spiked with crystalline polyethersulfone as in Example 3. Precipitation was not observed over 20 hours. Thus, polymer prepared in a dipolar aprotic solvent requires other means of crystallization, such as anti-solvent precipitation.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

What is claimed is:

1. A method for isolating a dihydroxybiphenyl- or dihydroxyphenyl-derived polyethersulfone which comprises:

(A) treating a solution thereof in an organic solvent to effect crystallization of said polyethersulfone which step comprises cooling the solution to the range of about 20–100° C., and optionally contacting the solution before or during cooling with a crystallization aid;

(B) separating the resulting crystallized polyethersulfone from said solution; and (C) removing by-product salts from said polyethersulfone.

2. The method according to claim 1 wherein at least 90% of the polyethersulfone crystals have a particle size of at least 15 microns.

3. The method according to claim 1 wherein the polyethersulfone is prepared from 4,4'-dihydroxybiphenyl and bis(4-chlorophenyl)sulfone.

4. The method according to claim 3 wherein the polyethersulfone is prepared in a dipolar aprotic solvent at a temperature in the range of about 150–300° C.

5. The method according to claim 3 wherein the polyethersulfone is prepared in a solvent system consisting of at least one water-immiscible aromatic solvent in the presence of a phase transfer catalyst, at a temperature in the range of about 125–250° C.

6. The method according to claim 5 wherein the solvent is o-dichlorobenzene.

7. The method according to claim 5 wherein the solvent is anisole.

8. The method according to claim 5 wherein the phase transfer catalyst is a hexaalkylguanidinium halide.

9. The method according to claim 5 wherein step A comprises slowly cooling the reaction mixture in which the polyethersulfone was prepared from the reaction temperature to one in the range of about 20–100° C.

10. The method according to claim 9 wherein the reaction mixture is contacted before or during cooling with a crystallization aid.

11. The method according to claim 10 wherein the crystallization aid is preformed polyethersulfone in its crystalline form.

12. The method according to claim 10 wherein the crystallization aid is an inorganic nucleating agent.

13. The method according to claim 5 wherein step B comprises filtration.

14. The method according to claim 13 wherein phase transfer catalyst is removed by washing with a polar organic liquid.

15. The method according to claim 5 wherein step C comprises extraction with water.

16. The method according to claim 15 wherein step C is conducted at a temperature in the range of about 60–90° C.

17. A method for isolating a dihydroxybiphenyl-derived polyethersulfone which comprises:

preparing said polysulfone by reaction of 4,4'-dihydroxybiphenyl with bis(4-chlorophenyl)sulfone in solution in a water-immiscible aromatic solvent in the presence of a phase transfer catalyst;

(A) cooling the polyethersulfone solution thus obtained from the reaction temperature to one in the range of about 20–40° C., to effect crystallization of said polyethersulfone to crystals at least 90% of which have a particle size of at least 15 microns;

(B) separating the resulting crystallized polyethersulfone from said solution by filtration; and (C) removing by-product salts from said polyethersulfone by extraction with water.

18. The method according to claim 17 wherein the aromatic solvent is o-dichlorobenzene.

19. The method according to claim 17 wherein the aromatic solvent is anisole.

20. The method according to claim 17 wherein the reaction mixture is contacted before or during cooling with preformed polyethersulfone in its crystalline form.

21. A crystalline dihydroxybiphenyl- or dihydroxyphenyl-derived polyethersulfone having an average particle size in the range of about 5–500 microns.

22. The crystalline polyethersulfone according to claim 21 which is derived from 4,4'-dihydroxybiphenyl and bis(4-chlorophenyl)sulfone.

* * * * *